(12) United States Patent
Morton

(10) Patent No.: US 6,868,190 B1
(45) Date of Patent: Mar. 15, 2005

(54) METHODS FOR AUTOMATICALLY AND SEMI-AUTOMATICALLY TRANSFORMING DIGITAL IMAGE DATA TO PROVIDE A DESIRED IMAGE LOOK

(75) Inventor: Roger A. Morton, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 775 days.

(21) Appl. No.: 09/692,282

(22) Filed: Oct. 19, 2000

(51) Int. Cl.[7] ............................................. G06K 9/64
(52) U.S. Cl. .................. 382/278; 382/209; 382/274; 382/275; 358/3.26; 358/3.27; 358/463; 348/208.42; 348/208.13
(58) Field of Search ................. 382/162, 209, 382/216, 218, 219, 274, 275, 278, 164, 165, 167, 190, 217, 282; 358/3.26, 3.27, 463, 518, 519, 520, 527, 538; 348/154, 208.42, 208.13

(56) References Cited

U.S. PATENT DOCUMENTS

| | | | |
|---|---|---|---|
| 3,993,976 A | | 11/1976 | Ginsburg |
| 4,935,616 A | | 6/1990 | Scott |
| 5,255,085 A | | 10/1993 | Spence |
| 5,383,027 A | * | 1/1995 | Harvey et al. ............... 358/296 |
| 5,406,326 A | | 4/1995 | Mowry |
| 5,442,407 A | * | 8/1995 | Iu ............................... 348/620 |
| 5,457,491 A | | 10/1995 | Mowry |
| 5,502,489 A | | 3/1996 | Kim et al. |
| 5,512,956 A | | 4/1996 | Yan |
| 5,528,339 A | * | 6/1996 | Buhr et al. .................... 355/32 |
| 5,548,327 A | | 8/1996 | Gunday et al. |
| 5,641,596 A | | 6/1997 | Gray et al. |
| 5,696,850 A | | 12/1997 | Parulski et al. |
| 5,754,184 A | | 5/1998 | Ring et al. |
| 5,801,856 A | * | 9/1998 | Moghadam et al. ........ 358/527 |
| 5,822,453 A | | 10/1998 | Lee et al. |
| 5,831,673 A | | 11/1998 | Przyborski et al. |
| 5,848,199 A | | 12/1998 | Naqvi |
| 5,982,427 A | | 11/1999 | Hunt et al. |
| 6,014,182 A | | 1/2000 | Swartz |
| 6,016,167 A | | 1/2000 | Brett |
| 6,069,714 A | | 5/2000 | Edgar |
| 6,242,166 B1 | * | 6/2001 | Irving et al. ................. 430/351 |
| 6,271,940 B1 | * | 8/2001 | Deschuytere et al. ........ 358/504 |
| 6,459,825 B1 | * | 10/2002 | Lippincott ................... 382/312 |
| 6,532,079 B1 | * | 3/2003 | Serex et al. ................ 358/1.15 |

* cited by examiner

Primary Examiner—Bhavesh M. Mehta
Assistant Examiner—Yosef Kassa
(74) Attorney, Agent, or Firm—Andrew J. Anderson

(57) ABSTRACT

A process for transforming digital source image data to provide a desired image look at the end of an imaging step chain is described comprising: defining desired values for at least two image look parameters associated with the desired image look; sensing the values of the defined image look parameters for the digital source image data; and modifying the digital source image data to provide digital output image data with at least one image look parameter value closer to the defined image look parameter value associated with the desired image look. The desired image look parameters may be defined with respect to an image to be displayed after further processing of the digital output image data downstream of the modifying step, information may be provided on the characteristics of the downstream processing, and the modifying step may be designed to compensate for effects of the downstream processing on the desired image look parameters.

9 Claims, 7 Drawing Sheets

METHODS FOR AUTOMATICALLY AND SEMI-AUTOMATICALLY TRANSFORMING DIGITAL IMAGE DATA TO PROVIDE A DESIRED IMAGE LOOK

FIELD OF THE INVENTION

The invention relates generally to the field of image processing, and more specifically to an image transformation process wherein source digital image data is modified to provide output digital image data with parameters corresponding to a desired image look.

BACKGROUND OF THE INVENTION

In traditional photography, including cinematography, many different processes take place during the preparation of a displayed image, including motion pictures. The imaging chain comprises the basic steps of image capture, image processing, and image display. In photographic film based systems, after capture of a scene on photographic origination film, the image processing step of the imaging chain may include multiple development steps, contact printing between films of different generations, and optical printing from film to film, before projection of a final print image. Each step in the image chain can influence the content of an image and therefore the appearance of the image. These influences can be broken down in a variety of ways. Many of these influences give the final image a specific appearance or "look". This appearance or "look" adds either artistic value to the final image or makes the image more pleasing to the viewer. While photographic systems are generally designed to maximize realistic reproduction of an original scene, the selection of film stock and processing conditions can change the "look" of the resulting image, and cinematographers make such selections to obtain specific desired looks.

By way of confirming this point, under a section entitled "THE FIELD OF ART", the Encyclopedia Britannica states one "view of art is based on the assumption that art is what survives a series of 'tests' given to objects that function as art. When such an object is initially presented to the view of people other than its creator, it could be viewed as representing a 'claim to art.' When it is accepted by large numbers of people in a society or by its established elites or by other artists and art critics, it could be said to have become a popularly, or authoritatively, or professionally validated work of art. But the ultimate test of its artistic quality is whether it can transcend the boundaries of time and space and be accepted by other peoples in other areas." Film looks in motion picture of themselves or as components of the overall creative process can be said to meet such "tests".

One such "look" is the photo-realistic or film "look" where by virtue of the processes of creating the final experience in the theater influences are added which to viewers make the image more pleasing than if these influences were not present. The term "photo-realistic" is generally understood by professional cinematographers or photographers to include the characteristics of the photographic film that captured the scene. They understand that in a darkened theatrical viewing environment the eye is more sensitive to the presence or absence of specific characteristics than when viewing a reflection print in ambient light. They also understand that viewers can be aware of the presence of image differences, although they may be able to point to or specifically identify the difference. Often the presence or absence of these differences can affect the impression of quality or satisfaction the viewer has of the overall theatrical experience. Specifically for example, the steps of capturing on film, developing the film, step printing or contact printing the film (often repeated times) and then projecting the film introduces added influences. When an image is generated using an image chain that lacks film steps or has a reduced number of film steps, the appearance of these photo realistic or film influences in the final image may be lacking or substantially diminished.

Electronic video cameras have been available for some time for capturing original scene information in electronic form. While image data in electronic form is generally easier to edit and modify than an image on photographic film, images recorded electronically have generally been regarded as of poorer quality than images recorded on photographic film when displayed. Also, the proliferation of various video formats has resulted in a variety of different resulting looks for electronically captured images.

In recent years, hybrid photographic film/electronic processing imaging systems have become prevalent. Hybrid systems typically comprise capturing original scene information on photographic film, scanning the film image to provide digital image data to allow for digital image data processing, and subsequently rewriting the processed digital image data to photographic film for display, or directly displaying the processed digital data by electronic means. Insertion of an intermediate electronic image data processing step allows, e.g., for the creation of digital special effects, or changing the "look" of the resulting displayed image, while retaining the benefits of capturing the original scene on film.

With the rapid advance of semiconductor electronics, it is now possible to contemplate the time when high quality motion pictures will be captured in the real world and on movie sets using electronic cameras such as CCD cameras. These cameras would likely use multiple CCDs, each operating with more than one to and up to six million pixels. One danger of electronic cameras is that although from a digital point of view they may generate image data that minimizes the artifacts normally associated with electronic capture, the images that result from this data are not seen as photo-realistic. Further, modern CCD based motion cameras often have literally thousands of combinations of possible camera instrumentation settings that are available to the cinematographer. Many of these settings have significant impact on the look of the captured image, and therefore selection of certain combinations may have unintended results with respect to the image look actually obtained relative to a desired look. This can represent a real threat to the cinematographer as he generally has only one opportunity to capture a scene and if the image data does not have the look the director desires it may not be possible to repeat the shoot.

Some attempts have been made to electronically introduce specific film like effects in electronically captured images. Examples include U.S. Pat. No. 4,935,816, which describes specific and limited digital processing techniques for achieving a film "look" in NTSC quality video. Examples of other prior art include attempting to introduce the appearance of film grain into images is found for example in electronic image editing packages such as Adobe PhotoShop and Adobe Premier. U.S. Pat. No. 5,641,596 discloses superior technology for adjusting film grain properties in digital images that provides a greater degree of photo-realism, and addresses adding grain to film images after digital processing of the film image data has removed the grain. U.S. Pat. No. 5,457,491 is directed towards a system for producing an image on a first medium, such as video, simulating the appearance of an image on a second medium, such as motion picture or other photographic film. Other patents such as U.S. Pat. Nos. 5,512,956, 5,502,489 and 5,442,407 show techniques for filtering and processing electronic images. Some of these methods are based on certain parameters within the image. However no attempt is made to characterize elements upstream in the imaging chain or the underlying imaging parameters required to produce a specific "look". U.S. Pat. No. 5,696,850 does attempt to characterize the upstream and downstream elements to achieve an "optimum sharpening level" however this level is not related to artistic intent or "look" characteristics. Nor is there any regard between sharpening and other essential image characteristics such as grain and noise. The invention does not specify "look" specifications or "look" specification points within the system. Furthermore, it does not specify the concept of reference looks and setting an intended look either with respect to the scene or with respect to a reference "look".

The fact that digital image data may be easily modified may result in the final displayed image being something other than the "look" which the cinematographer originally intended. Cinematographers involvement is often primarily before and during the photographic shoot. Electronic processing using either film based or electronic based cameras occurs necessarily after the photographic shoot. Supervising this electronic process to ensure that the intended "look" is maintained can require a considerable amount of additional time on the part of the Cinematographer.

With the recent advancements in electronic image capture and electronic image data processing, it would be desirable to provide a system whereby a source digital image data signal may be modified in an imaging chain to obtain digital image data which will provide a specific desired "look" without restrictions as to the origin of the source digital image data. Especially with electronically captured digital images, it may be necessary to first analyze or sense the characteristics of the camera images captured at the specific combination of camera settings employed in order to subsequently obtain a desired reference look or to define a new look in terms of the images produced by digital cameras. By providing a cinematographer with a way to specify a specific "look" and then applying metrics to assess how that "look" is achieved, the cinematographer may be freed from extensive involvement during the electronic processing stage.

SUMMARY OF THE INVENTION

In accordance with one embodiment of the invention, a process for transforming digital source image data to provide a desired image look at the end of an imaging step chain is described comprising: defining desired values for at least two image look parameters associated with the desired image look; sensing the values of the defined image look parameters for the digital source image data; and modifying the digital source image data to provide digital output image data with at least one image look parameter value closer to the defined image look parameter value associated with the desired image look. In accordance with preferred embodiments, the desired image look parameters may be defined with respect to an image to be displayed after further processing of the digital output image data downstream of the modifying step, information may be provided on the characteristics of the downstream processing, and the modifying step may be designed to compensate for effects of the downstream processing on the desired image look parameters. In accordance with further embodiments, the process may further include verifying whether the image look parameter values of the digital output image data provide a desired image look displayed at the end of the imaging step chain, and further modifying the digital source image data to provide digital output image data with at least one image look parameter value closer to the defined image look parameter value associated with the desired image look in response to the verifying step. The digital source image data may be directly modified to provide image look parameter values corresponding to an ultimate desired image look, or may be first modified to provide digital output image data with image look parameter values corresponding to a defined reference look, and the digital output image data is subsequently modified to provide digital image data with image look parameter values corresponding to a desired image look distinct from the defined reference look.

While various prior digital image processing art focuses on simulating existing image capture and display paths including both electronic and optical, this invention focuses on controlling image processing in a way that is largely independent of the way the image was generated so that a specific desired "look" can be achieved or modified through electronic processing, regardless of the source of the digital source image data. The invention provides a tool to produce high quality desired looks inexpensively by automatically or semi-automatically sensing and modifying digital image data to achieve studio quality photo-realism or other "looks" from electronically captured motion images. A key advantage of this invention is that it provides for automated means to provide specific looks, by e.g., grading, colorizing, compositing and editing images automatically and semi-automatically, thereby saving considerable manpower and effort in the postproduction effort. Another problem that this invention solves which has not been solved by the prior art is that by providing cinematographers with a way to specify a specific "look" and then applying metrics to assess how that "look" is achieved, cinematographers may be freed from extensive involvement during the electronic processing. These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
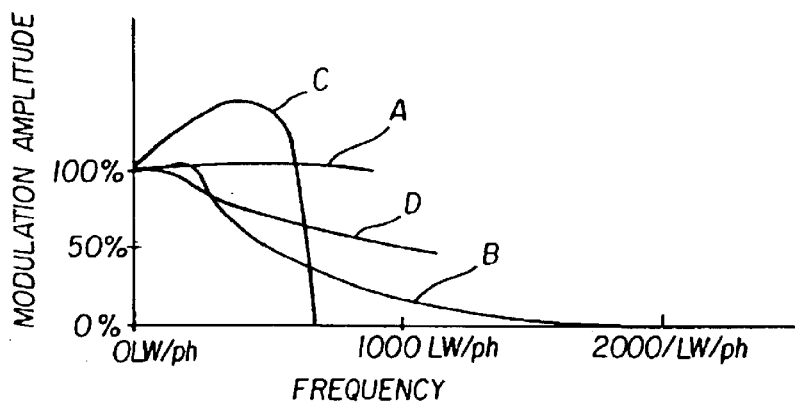
FIG. 1 is a plot for 4 different exemplary looks A–D of the modulation transfer function (MTF) of an image data signal in response to a scene.

Because image processing systems employing digital data processing are well known, the present description will be directed in particular to attributes forming part of, or cooperating more directly with, the present invention. Any attribute or element not specifically shown or described herein may be selected from those known in the art. In the following description, a preferred embodiment of the present invention would ordinarily be implemented as a software program, although those skilled in the art will readily recognize that the equivalent of such software may also be constructed in hardware including DSPs (digital signal processors), FPGAs (field programmable gate arrays) and ASICs (application specific integrated circuits). Given the method and system as described according to the invention in the following materials, software not specifically shown, described or suggested herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The invention defines a look transformation process which uses a sensing function to determine or sense the values or characteristics of defined parameters of digital source image data which influence (or may influence) the "look" (although the specific values or characteristics of the sensed parameters of the source image may not correspond to a specific "look") and as a function of these sensed parameters using electronic and other tools for modifying the values or characteristics of parameters of the source image data to produce a resultant or output image data so that when the image is displayed it has the desired "look". The invention may additionally include in the modifying step or after it, compensation for operations that may be performed on the image in the imaging chain between the look transformation process and the final display of the image so that the final displayed image has the desired "look".

The look transformation process may additionally include a verifying function to assess that the modifying of the values or characteristics or parameters of image data produces image data with the desired "look". The verifying step may also produce a rating indicating how close a resultant or output image data is to the desired "look". The verifying step may need to include compensation for operations performed on the image between the look transformation process and the final display. The look transformation process may also perform one or more iterative sensing and modifying cycles on the image data, wherein the defined image look parameters for the modified image data is re-sensed followed by another modifying step as a function of sensing the modified image data.

Selection of a desired image look may be performed, e.g., by one of the following representative means:

(a) Providing the Cinematographer with a sample of images of specific looks having defined image look parameters associated therewith and letting him choose the desired "look". This sample could be viewed as a motion picture sequence, as prints, see for example U.S. Pat. No. 6,122,006 entitled "A method for previewing a scene before actual capture by a motion picture camera". See also "A Verification System for Cinematographer Verification Tools" by Christopher C Woollard, SMPTE Journal August '99 pages 575 to 579.

(b) Allowing the Cinematographer to specify specific image "look" parameters in the areas of, e.g., sharpness, grain, tone scale, color saturation and whether these vary in scene dependent way. Then provide values of metrics that show how well these "look" goals have been met.

(c) Provide a range of "look" choices of scenes intended for inclusion in the production that may be created from material generated by location scouts. This may be done by transforming the source material through the "look" transformations to provide a selection of specific looks that may then be assessed to determine the final "look" that is desired for the movie. In some cases the capture means may be different than the means by which the image is captured ultimately and these transformations must be able to produce the same "look" from a variety of different sources.

In accordance with one embodiment, test images may be created. These images may then be used to monitor specific "look" parameters. Software designed to operate with these test images is able to compute the characteristics of the proceeding image chain in order to determine transformations necessary to achieve a desired "look".

In an alternative embodiment, key image look parameters indicating the processes already applied to the image are determined by measurements of image characteristics of the source image data. For example, edge profiles may be used to determine the MTF (modulation transfer function) and or phase response of the image chain preceding the point at which the measurement is occurred. As a further example, noise characteristics in texture free areas of the image may be used to identify and characterize noise sources in the preceding elements of the image chain and grain characteristics. Electronic or other noise, or film grain may also be characterized using for example spectral or correlation parameters or other parameters so that the characteristics of the correct signal processing may be determined and the signal processing may then be applied to the signal to achieve the desired look.

The extent to which a "look" may be achieved from specific source image data material is determined in part to the extent to which the information required by the "look" is available in the source material. In many cases image content already lost cannot be recovered however advanced algorithms including algorithms adaptive to edge characteristics, algorithms which remove jitter and unsteadiness, motion tracking, temporal averaging algorithms, scratch removal, noise removal and the like provide tools where image recovery and salvage makes it possible to achieve "look" transformation from source material.

Classification and Definition of Terms

The particular classification and definitions used in this patent is by way of an example only. This techniques and methods described will apply equally well to other classifications and definitions. Elements of other classification approaches are to be found in texts such as "Digital Film Making the Changing Art and Craft of Making Motion Pictures" by Thomas A Ohanian and Michael E Phillips, published by Focal Press, 1996, "A Technical Introduction to Video" by Charles A Poynton published by John Wiley and sons 1996 and "Digital Color Management Encoding Solutions" by Edward J Georgianni and Thomas Madden, published by Addison Wesley, 1998.

In general, classifications of image influences are often ambiguous and dependent on the interpretation or point of view of the viewer. For example, the digital process of posterizing may to some be the introduction of noise (in this example quantization noise), to others it may mean the addition of a desirable artistic effect, to others a change of amplitude resolution of an image. Similarly pointillism ("the practice of applying small strokes or dots of color to a surface so that from a distance they blend together. The technique is associated with the painting style known as Neo-Impressionism" Copyright 1994–1998 Encyclopaedia Britannica) a well-defined process for adding a specific type of noise into the process of painting is clearly recognizable as artistic.

The classification used in this patent is

Look—the values or characteristics or parameters of image data that influence (or may influence) the appearance though not the content of an image. Thus in general, any scene may be given any "look" and any "look" may be applied to a scene. A "look" is also (within system tolerances) deterministic, where as a scene (especially an outdoor scene) is variable depending. The processes (including optical, chemical, physical or electronic) that are applied to an image or scene determine a "look". This includes, for scenes that are artificially lit, the type of lighting that is used. An origination image may be used for different distribution and viewing situations and for each situation a different "look" may be required to achieve the best level of acceptance or artistic intent. Examples of such distribution "looks" include NTSC Video, PAL Video, HDTV, DVD or a specific release print film type, and may be specific to a viewing situation like a theater. "Looks" may also be characterized by source and image intent—for example a cartoon "look", or early film "look". Looks may also be defined in terms of a particular color gamut or introduced by defining a color transformation to scene data. They may be specified, e.g., in terms of signal parameters (see for example FIGS. 1 to 5). It may also be possible to register looks in much the same way as other works are trademarked or copyrighted.

Look Parameters—Examples include Contrast, Tone Scale, Sensor color gamut—including dynamic range, Display color gamut—including dynamic range, Color mapping from scene to screen, System Acutance, edge profile, System Grain characteristics, System Noise-Power spectrum, System Steadiness, Display Flutter, Display pixel placement, Refresh rate, Viewing environment, Amplitude, Amplitude Quantization, Modulation Transfer Function and so on. Generally, the value of "look" Parameters varies as function of signal amplitude and color and often interact so that changing one affects others. Look parameters may be determined experimentally by varying the look parameters and applying the parameters through the modification process, analytically by parameters based on an analysis of the actual situation—for example the parameters associated with a hazy look may be determined by actual analysis of atmospheric haze by measurement of the characteristics of images or image data which are deemed to have the desired look and by other means.

Amplitude—by this is meant intensity, brightness or color information as carried in the digital data representing the image. This information may apply to the entire image or to a specific position, specific region or a specific pixel within an image.

This amplitude data includes

Amplitude range—the definition of what extreme values of amplitude data mean A possible example of this is Definition of the color gamut the amplitude data represents and the meaning of these extreme values or the range of possible amplitudes that may be represented at a specific point in the imaging system.

Amplitude quantization—for example

The number of bits used to encode the amplitude data.

The number of bits used to encode the amplitude luminous or lightness data.

The number of bits used to encode the amplitude color data

Amplitude value definition—Significance of specific values of the amplitude data. For example The color space in which the amplitude data is represented.

The specific attribute the amplitude data is representing.

The meaning of each possible value of the amplitude data. This is important because each amplitude data in an image represents a specific point in an n dimensional space representing the spectral behavior of the image for that amplitude. Sometimes the term tone scale is loosely used to describe this relationship. However, this only has meanings within a specific media for a specific position in a specified image chain.

Specific specialized amplitude information examples of this include alpha channel encoding which are instructions on how to handle specific amplitude values.

Amplitude encodings—numerous amplitude encodings such as compression (for example JPEG) may change the meaning and values of specific amplitude data.

Transformations—Linear and non-linear processes that change the meaning of amplitude data Signal amplitude—the component of the amplitude of the signal that is thought of as representing the desired original scene. Alternatively, the component of the amplitude that remains when noise is removed. Sometimes the concept of signal amplitude relates to the incoming signal of a specific function in an image chain whether or not the incoming signal contains noise.

Tone Scale—description of the transformation applied to image amplitude or relation between image amplitudes (at the same position in an image—generally where the image amplitude is slowly changing) at different points in an imaging system, including possibly the point in the system corresponding to the original scene or the original objects in the scene.

Noise—any addition to the original scene or signal amplitude that has a random component with respect to the original scene. This randomness may be in amplitude or position and would include pixel position with respect to the original scene.

Noise amplitude—The amplitude of the noise component in an image. Like some of the other definitions here the definition and concept of noise is subject to interpretation and point of view. Noise can for example be dirt on a window through which a scene is captured Random Noise—Noise that appears to be unrelated at least to a first order to other parts of the image or which is generated by random events somewhere in the image chain.

Quantization noise—The noise that is introduced when an image is digitized into discrete levels the difference between the actual value of the image before digitization and the discrete level representing the image can be considered noise introduced by the quantization process.

Artifacts—Examples include dirt, scratches, and other image components introduced in the image chain generally unintentionally. Sometimes quantization noise is considered an artifact.

Dirt—An artifact in an image that appears to be due to dirt or particles or foreign matter within one of the optical paths of the image chain.

Grain noise—Noise introduced in an image due or having the characteristics of the discrete silver halide grains or dye clouds within a film image.

Color noise—Noise in which is introduced where the color of an image is changed as well as or independently of a change in the luminance of the image.

Position—The coordinates of the image in a specific frame.

Amplitude at a specific point in the image—Generally the color, intensity or some other amplitude measure of an image at the specified point.

Pixel—A location within an image at which a specific image amplitude occurs.

Scan Format—The sequential order and pattern in which amplitude data corresponding to the pixels within an image is captured, presented, stored or represented.

Interlace—A scan format in which pixels are represented in lines. The spacing between successive lines is greater than the overall spacing of lines within a frame.

Filtering—An intentional or unintentional process by which the amplitude at a specific pixel or location is changed by the amplitude of a pixel at another positional location.

Flare—The change in amplitude of pixel values over the region of the image due to higher intensity or higher brightness amplitude areas within an image. Physically, light scatter within optical elements of the image chain normally causes flare.

Resolution—The spacing between a regular array of pixels used to sample an image or some measure of the filtering that occurs within an image.

Modulation Transfer Function—A measure of the resolution of an image based on the response of the image to sine wave patterns.

Sharpness—Perceived measure of how sharp an image is. Such measures can be determined as a function of Modulation Transfer, Rise Distance or Edge Profile or Focus of an image, and is also influenced by contrast of the image.

Acutance—An objective measure of the subjective sharpness of an image.

Edge Profile—When a sequence of pixels traverse the edge of an image (that is to say an area of an image where the amplitude changes from an initial value to another value) ideally the amplitude values would change like a step from the initial value to the final value. In fact, due to characteristics of the value chain, this transition is more gradual. The shape traced out by the change in amplitude from the initial value to the final value is termed the edge profile.

Rise Distance—A measure of the resolution of an image made by determining spatial distance across an edge profile that is required for amplitude data to change from one predetermined image level to another.

Focus—A specific type of filtering which is applied optically to an image due to lens characteristics or the deviation of areas of the image from the focal plane of the lens. This type of filtering can be also applied electronically in order to simulate optical effects Depth of Field—The range of distance away from the camera (sometimes referred to as the z direction) that an object can be and still be captured without loss of resolution.

Aliasing—A form of noise that occurs because there is more detail in an image than can be captured by the spacing between the pixels of the image.

Frame—The actual or simulated image of a scene taken at a single point in time generally through a single camera lens.

Frame Rate—The number of frames per second in a motion image.

Jitter—The degree to which successive frames of the same scene are positionally misregistered with respect to each other. Sometimes jitter is referred to as unsteadiness.

Weave—A form of low frequency jitter that is generally due to spatial misregistration, in the horizontal direction, between frames.

Each of the above characteristics as well as other image characteristics can be contributors to the overall "look" of an image. Consequently, each of the above characteristics and other characteristics can be sensed, transformed, modified, removed, inserted and verified. The current state of the art of chemical and electronic image processing practices combinations of these functions. However the automatic and semiautomatic process of selecting a desired "look" by defining desired values for at least two image look parameters (preferably at least 3 and more preferably at least 4 image look parameters) associated with the desired look, sensing the values of the image look parameters for digital source image data, and transforming the source image data to obtain values closer to the desired look defined values (which may include modifying, removing, inserting and verifying) to obtain a specific "look" constitutes the novelty of this disclosure.

Examples of possible desired "looks" which may be defined in terms of desired image look parameters in accordance with the invention include: Standard reference looks for archival purposes; Specific "look" associated with specific origination film type and/or print film type and associated processing; A "look" associated in addition with a specific lens type or lens effect; A video "look"; An HDTV "look"; Computer graphics generated "look"; A cartoon "look"; A "look" associated with a specific lighting effect; A theme "look" corresponding to a specific commercial "look"; A specific black and white "look" such as an Ansel "look"; A specific color "look" including color temperature or color gamut, to mention a few.

As already discussed there are many image look parameter specifications that may be used to define a specific look. By way of example five functions will be shown here for each of four specific example "looks" labeled A to D which may be used as input for the image look transformation process of the invention:

A. A cartoon look
B. A photo realistic film look
C. The look that would be obtained from a HD TV camera
D. And a gritty, artistic look These looks may be specified with respect to the desired values of the image data signal before compensation is applied for the output path from the image transformation process to a downstream viewing point. Compensation for the specific output path will of course result in these values being changed.

FIG. 1 shows the modulation transfer function (MTF) of an image data signal in response to a scene. The frequency axis of the MTF function is defined in terms of line widths per picture height (for cycles of picture height divide by two). A modulation transfer amplitude of for example 100% at a specified frequency means that the amplitude an image data signal of the specified frequency would have the same amplitude in the image data as would be found in the output of a perfect camera if it photographed the original scene. Similarly a figure of 50% means that the amplitude in the image data would be half the amplitude that a perfect camera would produce, at the specified frequency, if it photographed the scene. In the case of the cartoon look A, the ideal scene would be a cartoon of the scene drawn without any frequency limitations or addition of noise. Thus for example the cartoon look A has sharp edges and therefore has a high frequency response that trails out as far as measurement allows. The gritty look D will also have harsh edges due to the high contrast of the scene and therefore it also has a higher frequency response than the photo realistic look B. Photo realistic look B initially plateaus or even goes above 100% due to chemical frequency boost in the negative and then trails off due to the MTF of the lens of the capturing camera. Video look C is typically signal processed to produce a high MTF value so that the image appears sharp while being limited by the resolution of the scan format used.

Figure 2:
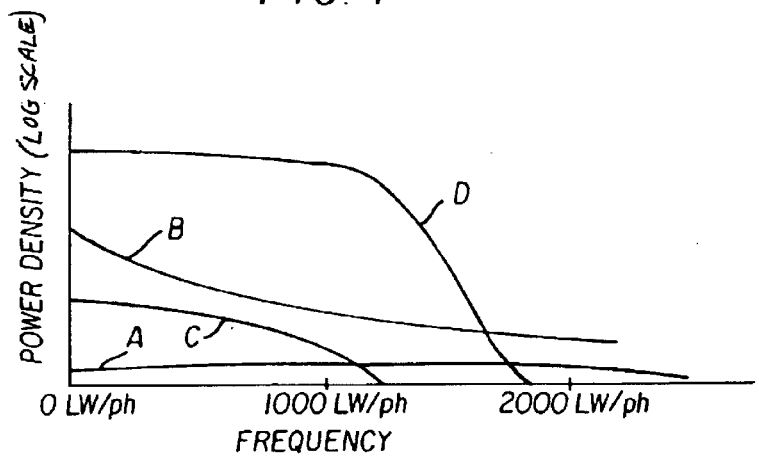
FIG. 2 is a plot for 4 different exemplary looks A–D of the power density spectrum of the noise of the system averaged over the full color range.

FIG. 2 shows the power density spectrum of the noise of the system averaged over the full color range. This power density will change as a function of color, however to a first approximation the power density across the entire scene can be used to specify the look. In the case of the cartoon look A there is very little noise the main source being quantization error in the digital representation that will tail off at some frequency as a function of the scan format chosen. For the photo realistic film look B the film grain of the negative film is the dominant source and for most film types, it approximately follows the curve of the square of the MTF of the scanner that scanned the film. The amount of noise power is a function of the film type. Noise of the video look C is a function of the scan format and the gritty look D will have a high noise power spectrum from sharp edged gritty grains and then trail off because of the size of the grittiness. Another possible key specification to define grittiness, not shown here, is the size distribution of the grit specified as a cumulative or density distribution plotted against the number of pixels. Another possible key specification is the shape of the grit. FIG. 2 shows noise summed over all frequencies as a function of intensity in the scene. These curves are for luminous noise (which is a weighted sum of RGB values for example in the range of 0.302 for red weighting, 0.585 for green and 0.113 for blue) however when for greater accuracy red, green and blue noise are independently specified, the photo realistic film look B curve would typically be higher for blue than for other colors.

Figure 3:
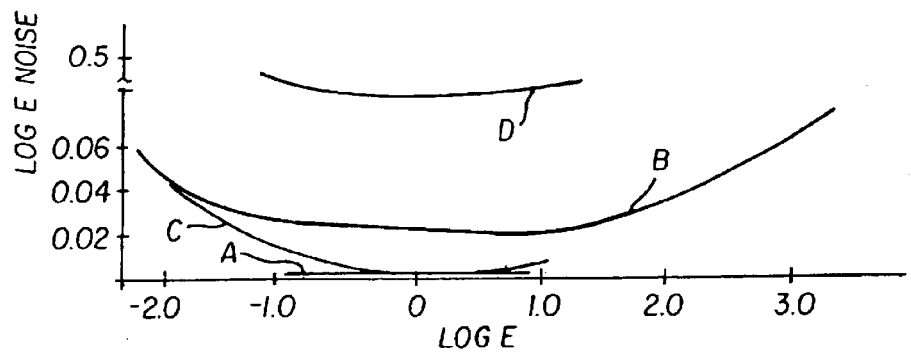
FIG. 3 is a plot for 4 different exemplary looks A–D of dynamic exposure range (in terms of log exposure) on the horizontal axis and noise on the vertical axis.

The curves in FIG. 3 show exposure in terms of the logarithm to the base 10 of linear exposure E where a Log E of 0 corresponds to an 18% gray card in the scene. Thus the cartoon look A has a limited dynamic range and very low noise. The photo realistic look B has a wide dynamic range with noise being a minimum in the vicinity of where Log E equals 0. The vertical axis in this plot corresponds to noise measured as if it is translated back to the effective noise level in the scene. This will be used to generate the look noise signal in the data Note that for the gritty scene look D the axis has been broken to include it in the scale.

Figure 4:
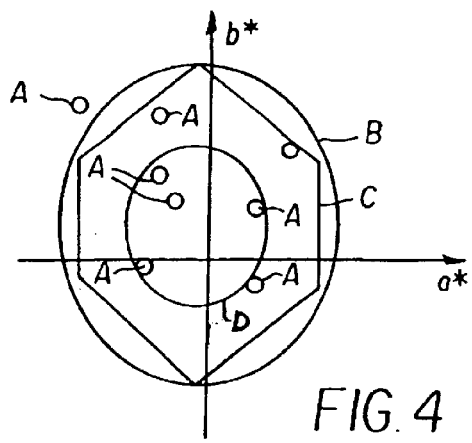
FIG. 4 is a plot for 4 different exemplary looks A–D depicting color gamut in the form of a* and b* scales of the L* a* b* color space.

FIG. 4 shows the color gamut associated with each look. This is plotted on a* and b* scales of the L* a* b* color space. The color gamut for a cartoon look A is represented by small circles corresponding to the colors with which the cartoon is rendered. The video look C color gamut is defined by the primaries of the video camera for example the SMPTE 709 primaries while the film look B color gamut is shown as slightly wider area B and the gritty look D which normally has associated with it little color and strong blacks and whites is shown as narrower area D.

Figure 5:
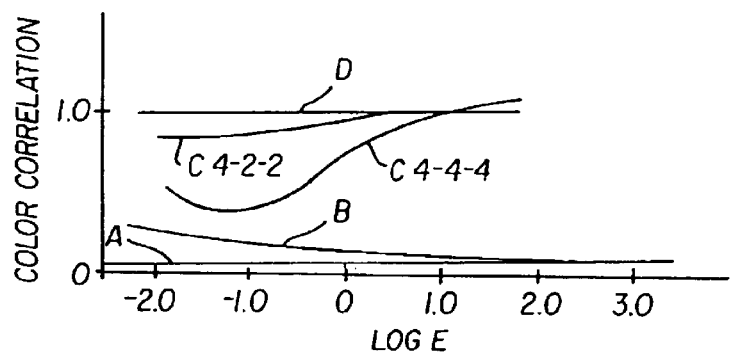
FIG. 5 is a plot for 4 different exemplary looks A–D of the color correlation coefficient of the noise or grain in an image versus log exposure.

FIG. 5 shows the color correlation coefficient of the noise or grain in the image. By color correlation is meant the product summed across all colors of the color cross products and it is a measure of how strongly correlated is the grain in one color to the grain in other colors. For the cartoon look A noise is small and therefore color correlation of noise is not a look issue. For the film look B the color correlation is low because grain noise is largely independent in each layer, while the color correlation in the TV camera case C will depend in part on the format. For example 4-2-2 sampling produces higher color correlation than 4-4-4. Generally in a gritty look D because the gritty grains are black and white the color correlation is high.

Figure 6:
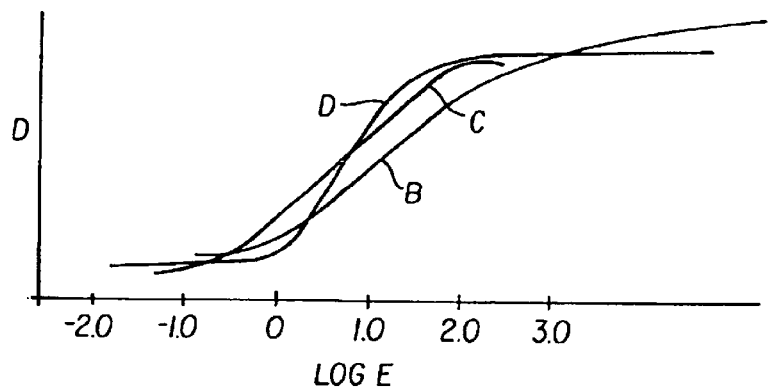
FIG. 6 is a density versus log exposure plot for 3 different exemplary looks B–D illustrating typical luminance tone scales.

FIG. 6 shows a typical luminance tone scale for film look B. The video look C has a reduced highlight range compared to film and the gritty look D has a higher contrast than the conventional film look. Cartoon look A is not depicted in FIG. 6 as where the image is not related to a scene the tone scale is not relevant.

Sensing Characteristics

Many different processes take place during the preparation of a motion picture. These include multiple development steps, contact printing between films of different generations, optical printing from film to film and if electronic steps are involved scanning rendering images into various color spaces sub-sampling to mention a few. Each of these steps can change the "look" of the image. For example, sharpness, noise characteristics, color rendition, step response and numerous other variables can be changed by any one of these steps. In addition, these steps may introduce additional noise and other artifacts. As a result of the impact of the result of these steps, it may be desirable to assess or reassess the intrinsic "look" within the image by measuring the key "look" parameters of the image at a given stage in the process and then adjust the image to establish or re-establish the desired "look".

By way of example only, methods for sensing the values, or measuring "look" parameters in accordance with the invention, will be considered in each of the sections below. The measurement may however include measurements on both the actual image and measurements on test images that are part of the particular scene "take". These test images may be viewed at the beginning of the take through the camera, may be pre-written onto the origination film, or electronically introduced at the point where the image is rendered electronically. Sometimes these test images may be introduced at a later stage in the process. Test images may include bar charts, slanted or horizontal or vertical edges, images of film grain, noise images, color test patterns, step wedges, continuous gray wedges, checkerboards or other test images which may be specifically designed for specific parameters and to operate with specific sensing algorithms which sense the image parameters associated with noise.

The goal of the sensing process may be to determine any one or more of the image look parameter characteristics classified above of a specific image or scene or it may be to characterize the path that has delivered the image to the point where sensing takes place. Characterizing the path may include the path from example the camera lens to the point where sensing takes place or it may be taken to include the scene including for example the scene lighting, depth of scene in relation to the focal setting of the lens and possibly any haze or other optical artifact in the scene. Parameter values that are invariant with process may be carried along with images as metadata Alternatively functions may read metadata and modify it based on the process performed by the function.

This information as already mentioned is based on the characteristics of the incoming signal sent to the sensing operation, the desired "look" at the output of the transformation process or at a downstream point for example on the viewers' retina, as perceived by the viewer or on the displayed screen. If the desired "look" is specified at some downstream point then the sensing function also receives information on the characteristics of the processors downstream from the transformation process. This characterization information may take the form of actual images, either test images or real scenes or parameters or models that describe some elements or all elements of the downstream process. Sometimes the downstream process is specified as a combination of these different realizations.

There are numerous possible approaches to the sensing operation. For example, one is to use image information to generate a model of the upstream and optionally the downstream process and use that model to derive the control values that are necessary to be sent to the modifying process. Another approach is to directly determine the parameters of the modifying process from the incoming image data or specifications of the upstream process and optionally the downstream process. A combination of these is also possible.

The sensing function is responsible not only for sensing the conditions of the incoming image data signal, and also optionally the downstream processors, it is also responsible for determining the parameters required for the modification process, including the removal and insertion processes or transformation process. Examples of the output of the sensing process to control the modifying process are algorithm parameters such as convolution kernel coefficients, or look up table values to transform tone scale form, or color or matrix coefficients to perform matrix operations for tone or color. Other examples include coefficients of custom algorithms such as frame averaging algorithms. These parameters may be fixed or varied scene by scene or vary as a function of scene parameters.

One system that the sensing function may use to generate algorithm coefficients for the modify or transformation function is to receive a reference image or images that have the desired look and then compare these images to images of the same scene taken with the capture source or camera set to nominal values. By determining within the sensing function the specific transforms or transform coefficients or control signals needed to make the images from the capture source match the reference images the sensing function will have determined the specific transforms or transform coefficients or control signals which need to be applied to all images from the capture source to match the reference images.

Modifying

The specific processes or combinations of removing and or inserting that are used in a specific transformation process. The modifying function may be fully automatic or certain aspects of it may be manually controlled. It involves the use of electronic, chemical or other tools to transform the image. While there are various types of modifying processors, they all depend on the output of the sensing function to specify the operation that is to be performed.

For example the modifying process may involve taking the incoming signal and modifying it so that it produces a signal which either at the output of the transformation process or downstream at the specified output point produces a signal which meets specifications. Alternatively the modifying process may first need to remove artifacts from the incoming signal (these artifacts may include noise, the effects of dirt, distortions in tone scale, distortions introduced by upstream elements such as lenses or CCDs, flare, coma, astigmatism, focus artifacts such as incorrect depth of field and so on) before performing the desired operation of inserting the required "look" at the specified downstream point. Which of these approaches is chosen depends on the desired "look" in relation to the available incoming signal. For example, if a noisier "look" is required it may not be necessary to remove noise before inserting the desired noise. It may also be desired to remove artifacts which vary from scene to scene or as a function of the camera or upstream process used so that an image with a reference "look" is obtained for every scene and then the same insertion process may be used for all scenes to obtain the desired "look". These issues sometimes arise not on a scene by scene based but based on some other image parameter such as a specific image source or as a specific parameter such as noise level.

The approach used in the modifying block may also be different for one class of parameters than another. For example tone and color variations may be removed to provide a reference tone and color image while noise and sharpness variations may be sensed and then the noise and sharpness characteristics of the image may be modified to the desired values. When the two step removing and inserting process is used, the modifying function may be broken down into two elements as described below.

Removing: Using appropriate algorithms can reduce the effects of artifacts that may be introduced ahead of a particular point in the process. These algorithms can for example remove noise, may sharpen an image, may reset the color calibration, or remove quantization errors, compensate for shading or lighting, correct a tone scale or compensate for artifacts introduced by previous sub-sampling processes.

Inserting: Specific film "look" characteristics may be inserted into the image such as noise, revised color grading, additional sharpening effects, tone scale effects and so on.

Verifying

A further possible processing step is that of verifying that after the steps of removing and inserting have been performed the desired goal has been reached. Alternatively, the verifying step may be used to provide a measure of how close to the desired goal the process resulting image has reached. This information may be used for appropriate labeling or branding of the "look" or may be used to determine if the prior steps need to be repeated in order to better achieve the desired "look".

If the target specified desired "look" is defined at a downstream point then the verifying function must use the downstream information in characterizing whether the output of the modification process will meet the desired goal. Alternatively, the verifying function may receive the signal from a downstream point where the desired "look" is to appear. For example it may be that the verifying function receives information from a camera observing the scene as it is being projected and viewed by the audience.

Interaction Between Functions

The basic functions of sensing, modifying which may include removing and inserting, and verifying can be used to either produce a desired "look" or introduce a standard reference "look" for archival purposes from which a desired "look" can be generated. As already mentioned the sensing process performs measurements (absolute or relative) or analysis on incoming images or uses information that characterizes the incoming image. These characterizations must then be compared to the equivalent characterizations of the "look" specification. If the modifying process includes removing and inserting then the degree of removal required to meet a reference "look" corresponding to the image sent to the inserting process must be determined by the sensing process. If on the other hand the modify function modifies the incoming image to meet the "look" specification at the output of the transformation process or at some downstream position, then the sensing function must determine the parameters required to modify the image from its sensed incoming "look" to the desired output "look". This degree of modification is communicated to the modify function in terms of algorithm parameters. To achieve this reliably the sensing function must be able to set algorithm parameters which produce a desired "look" based on either:

(a) Modify algorithm characterizations that specify algorithm parameters, which modify from one specific incoming "look" parameter value to the desired "look" parameter value. Examples include where the upstream MTF from scene to transformation process is determined by MTF analysis performed in the sensing function on test images, and the downstream MTF system is similarly determined or is pre-specified. The product of these two MTFs provide the overall system MTF from scene to output "look" reference point. This overall MTF is compared to the MTF desired from scene to downstream "look" reference point and the ratio of the MTF desired by the "look" and the system MTF define the MTF of the filter function in the modify step. The sensing function next computes filter characteristics such as kernel coefficients for the modify step and communicates them to the modify step.

Or (b) Iterative interaction between sensing, modify and verify functions on single frames or test scenes to determine algorithm coefficients which provide the closest image characteristics to the desired "look". Again, the goal is with respect to the "look" reference point at the output of the modify function or some downstream point. In this mode single frames or test scenes are sensed, modify algorithm parameters are provided by the sensing function and then irrelative adjustments are made to these parameters by the sensing function in response to information regarding the values of "look" parameters as determined by the verify function for each iteration. This process may involve the use of Newton Raphson, conjugate or Genetic algorithms that the sensing function uses to iteratively adjust algorithm parameters sent to the modify function.

Block Diagram Illustration

Figure 7:
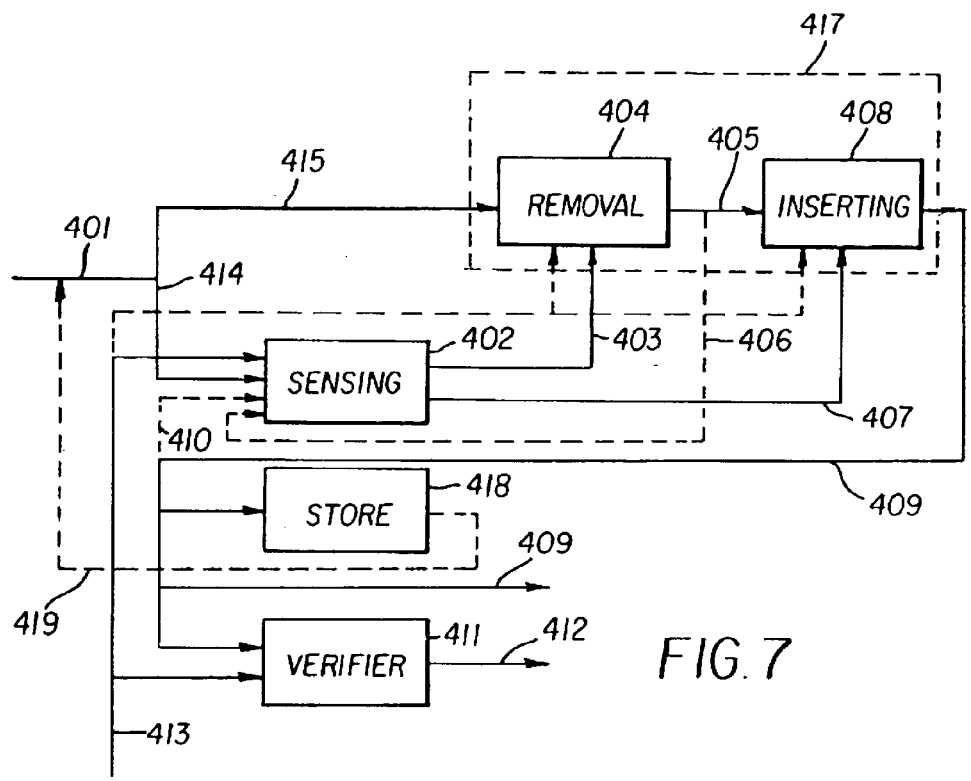
FIG. 7 is a block diagram representation of an image transformation system for modifying digital source image data in accordance with the present invention.

FIG. 7 shows how these basic steps can be utilized to either produce a standard "look" or introduce a standard reference "look" for archival purposes. The incoming image data (electronically captured or scanned) enters on line 401 and passes on line 414 to the Sensing step 402 that senses the key characteristics of the "look" and determines the removal steps that need to be taken to achieve the desired "look". This information is passed on line 403 to the Removal function 404. Removal function 404 receives the image on line 401 through line 415 and performs the removal processes specified by the Sensing function 402.

Similarly the Sensing function 402 determines the inserting functions based on the data on line 401 and optionally also on image data corresponding to the image stream on line 405 after being subject to the Removal function 404. This data is passed on optional line 406 to a second input of the Sensing function. The Inserting function 408 receives the control data on line 407 based on Sensing data from line 401 and optionally based on the data in line 406. Inserting function 408 then inserts grain, color, tone scale and/or other characteristics into the image stream 405 and outputs it on line 409. Optionally feed back from the results of the Inserting function 408 may be communicated on optional line 410 to the Sensing function 402 which may make adjustments to the control data on either lines 403 or 407. The data on line 406 may also be used to modify the signals on line 403 to improve the characteristics of the Removal function 404 by modifying the control data on line 403.

Sensing function 402 may also be split into separate Sensing components each one responding to some combination of inputs 401, 406, and 410, and outputs 403 and 407. More than one each of the Removal 404 and Inserting 408 functions may also be used and may be connected sequentially in the image stream using independent or single Sensing elements.

Once the image data is processed Verifier function 411 verifies the results of the processing for a specific "look" and the accuracy of the "look" with respect to the desired "look" is communicated on line 412. This information will be used as a quality assessment and also used to identify the range of applicability of the image data also being sent on line 409. If the quality on line 412 is not sufficient for the desired "look", it may be necessary to repeat the process of Sensing, Removal, Inserting and Verifying. In order to perform Verification that the desired result is being achieved at a downstream point, either the Sensing function 402 must communicate with the Verifying function 411 regarding downstream conditions or the Verifying function 411 must receive information from the downstream point regarding downstream processes. Neither the optional line from the Sensing 402 to the Verification function 411 or the optional line from the downstream point regarding downstream processors or images is included in this diagram.

The specific desired "look" is communicated to the system through data on line 413. This data may either include specifications (e.g., defined image look parameter value ranges) regarding the desired "look" or actually specify the specific "look" desired, such as a look selected from the exemplary looks described above. Sometimes information on the "look" entered on line 413 of FIG. 7 will also have to include information about the type of subsequent processing being performed so that the removal and inserting functions are programmed by the sensing function to compensate for the effects of the downstream processing such as the type of film recorder, intermediate film stages and type, print film, film projector, television transmission, television format, and/or digital projector used. It may also be necessary to compensate for other components such as the screen type. Alternatively, in order to compensate for downstream processors the Sensing function 402 may receive information directly from the downstream point regarding these downstream processors or image information. This optional line from the downstream point regarding these downstream processes is not included in FIG. 7.

With reference to prior definitions to terms the functions of Removal 404 and Inserting 408 may be grouped together under the general heading of Modifying 417. It may also be appreciated that iterative processes may be needed and this may for example be determined by the quality signal 412. If iterative processes are applied they can for example be applied by sending the signal on 409 to a Store 418 and when the processing of the first pass involving functions 412, 404, 408 and optionally 411 the output of the store may be sent along dotted line 419 to drive image input signal 401 for a subsequent pass of the data.

The Verifying function 411 may in some cases be entirely manual involving previewing by an operator, a director, an editor or cinematographer. Alternately the Verifying function 411 may be fully automatic with a manual quality control check or some other combination. Some processes used in Verifying 411 may be generally based on the same techniques and not be dissimilar to the measurement processes used in the Sensing function 402. The results of Verifying can be used as either a quality criteria that may be used to initiate further modifying operations. In fact, the output of the verifier on line 412 may be used in some cases to control any subsequent Modify operations.

Sensing, Modifying, Verifying Processes Applied to Specific Parameters

The process of Sensing may involve a variety of possible functions depending on the selection of Look parameters and values and characteristics. The following description describes processes for Sensing, Modifying, and Verifying specific look parameters singly or in combination.

The Cineon System manufactured by Kodak and Adobe Photo-shop both contain image processing tools which are able to determine signal amplitude and other elementary image parameters at a particular point or averaged over a specific area. These tools can be controlled using scripts so that semiautomatic sequences of measurements can be generated. While in the past these were used as measurements on images using the methods described in this invention these software tools can also be used to generate scripts and produce measurements that specifically relate to "look" parameters. In some cases, the specific measurements that relate to specific looks are not available within the tool set. However, methods described herein enable one skilled in the art to develop such measurement tools in either hardware or software, including development of additional software or scripts which may be required to ensure that the Sensing function is able to automatically or semi-automatically select and or control the required modification functions to obtain the desired look parameter values.

Amplitude

The term amplitude means intensity, brightness or color information as carried in the digital data representing the image. This information may apply to the entire image or to a specific position, specific region or a specific pixel within an image.

Amplitude data includes amplitude range. The amplitude range of incoming data may be sensed by receiving the entire image set on line 401 and determining maximum and minimum values of the incoming values. These maximum and minimum values may include for example the maximum value of red, green and blue signals if the incoming signal has RGB presentation or may by performing color transformations, depending on the range color space of the Amplitude Range Look parameters determine the amplitude range by taking the maximum and minimum of the values within the transformed color space. Generally, six values will be obtained from each transformed color space.

Figure 8:
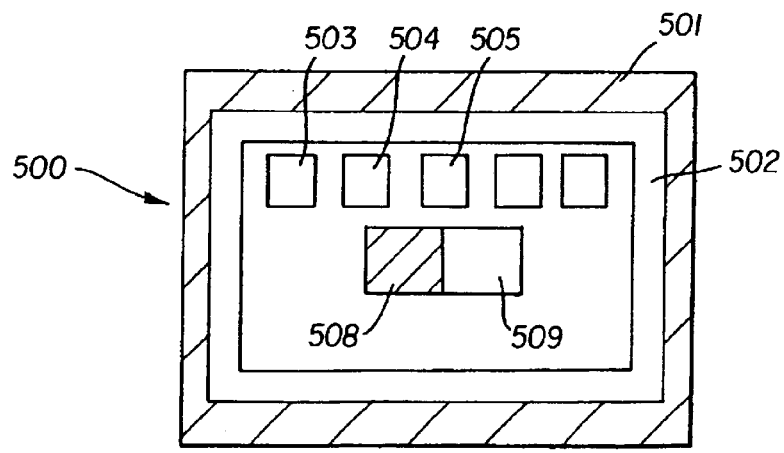
FIG. 8 is a schematic diagram of a test image which may be used in accordance with one embodiment of the invention.
Figure 9:
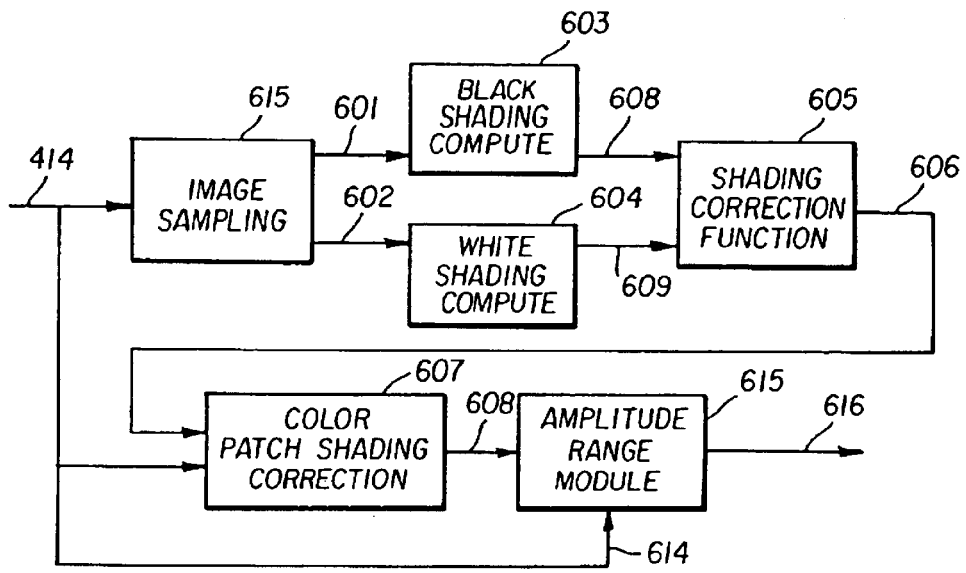
FIG. 9 is a block diagram representation of a sub-system which may be used to sense shading and color parameter values of digital image data in accordance with one embodiment of the invention.

In some cases, it will be desirable to have specific images extracted from the original scene or introduced at some point in the image chain that can be used to determine the amplitude range of the signal. If the color space of the image data is not known, color test images may be required. Examples of this may include specially designed images, color charts such as MacBeth charts or gray scale charts. In some cases, it may also be desirable to have images that include specular highlights. FIG. 8 shows an example of such a test image 500. Image 500 may include a black and white border for example containing a black band 501 and a white band 502 which band may be used to sense black and white levels at the edges of the image in order to determine the shading which has been introduced in the image chain downstream at the point from which this test was introduced. Within the test image are color patches such as 503, 504 and 505. In addition, black and white areas 508 and 509 within the center of the image 500 have the same intensity values as 501 and 502 respectively. These central areas may be used to determine shading with respect to the center of the image. Thus the first step as shown in FIG. 9 is to sample areas 501 and 502 of incoming image 414 in image sampling box 615 and then send the image data corresponding to area 501 on line 601 and the image corresponding to area 502 on line 602 to shading compute process 603 and 604 respectively from which shading at the back end and white end of the amplitude range may be computed and then a correction function for the overall image is computed in process 605 as a result of the interpolated data for patches 501 and 508 on line 608 and 502 and 509 on line 609. This data is then used in process 605 to generate a shading correction function on line 606. This shading correction function is then applied to the incoming image in process 607 to produce corrected values for patches 503, 504, 505 and so on in the image. This shading corrected function for the patches 503 and so on then appears on line 608 and is sent to a module 615 containing information about the specific identification of the patches 503 and so on. This information regarding location and value of patches may be imbedded into module or may be decoded by module 615 by data associated with the image and entering on line 414. However module 615 obtains the patch specific data including the x-y coordinates and the intended amplitude data, the further task of module 615 is to extract the average amplitude values of the patches and identify the intended value or purpose of the patch and produce data corresponding to amplitude range based on patch data indicating the extremities of the color gamut, color space or some other amplitude range that is associated with each patch. Thus for example there may be specular highlight patches, intermediate color or gray scale patches, maximum color patches or white patches as well as minimum color patches or dark patches each configured for specific color spaces. Thus, data may emerge on line 616 regarding information describing the amplitude range of the incoming image on 414.

Test images may also be automatically identified using bar codes placed on the test image and then decoded in the Sensing function. This enables the Sensing function to automatically identify the test image and proceed to analyze the image using software, appropriate to the test image, which extracts the required image parameters.

Figure 10:
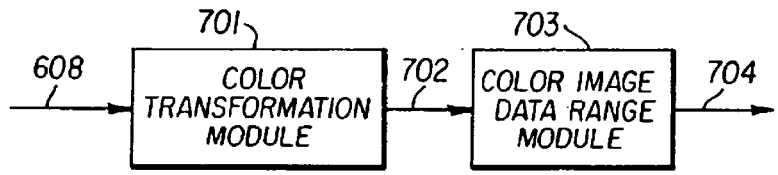
FIG. 10 is a block diagram representation of a color transformation sub-system which may be used in accordance with one embodiment of the invention.

If test images are not available but the color space of the data is known, then the black and white shading corrected image data on line 608 of FIG. 9 may as shown in FIG. 10 be received and sent through a color transformation module 701 to a line 702 which contains the color transformed image data corrected for shading and then module 703 may obtain the various combinations for maxima and minima across the image or image set. It will be appreciated that when 3 color data values for each pixel describe the coordinates, for example, in a YUV color space, then there are 7 possible maxima and 7 possible minima. In addition, a range of averages may also be obtained. These are output on line 704. Having obtained the maxima and minima data, it remains to generate from the Sensing system the control sequence that must be sent to the Modifying function 417. Certain looks for example require a wider dynamic range while others require limited dynamic range because of the need to accurately present the "look" within the constrains of the downstream processing and display mechanisms. Thus having determined the maximum and minimum value amplitude transformations need to be computed in order to ensure that the amplitude range satisfies both the "look" and the constraint of the downstream processes.

Amplitude quantization can be automatically measured in a variety of ways. One technique is to take the shading corrected image at point 608 in FIG. 9 and histogram the entire image using one histogram location for every digital value of the image. Once the entire image or image set has been histogrammed in this way there will be values or bins within the histogram which will be highly populated and bins adjacent to each highly populated bin which are unpopulated or sparsely populated. To determine quantization levels within the image adjacent sets of highly populated locations are identified and the quantization amplitude is the distance between those adjacent sets. Thus, the quantization values will be a function in general of amplitude.

Sometimes between the point 414 and the point where the quantization will be introduced noise will have been introduced into the system. This noise may in some cases mask the quantization and may dominate the "look". However in some cases, quantization remains a key factor and evidence of it will reappear in the Insertion process if it is not removed in the Removal step. Thus to prevent the noise which has been introduced after the point where the quantization has occurred from masking the quantization it may be necessary to perform temporal averaging between successive frames to mask out or remove the noise before performing the quantization analysis. This temporal averaging will operate best by temporally averaging across successive frames with identical content unless motion correction is applied before performing the temporal averaging. In addition, the temporal averaging will only operate if the noise introduced is uncorrelated to at least some degree from frame to frame.

Another way to sense quantization is to use ramp or continuously shaded color test images which preferably are identical from frame to frame to allow for temporal averaging. The temporally averaged result from these continuous images will correspond to an image whose values for the quantization level of the processes prior to the point 414 that is the input to the "look" transformation process.

Amplitude value definition may be Sensed based on data associated with the image or if this is lacking by analyzing the amplitude values of specific test patches in the scene or scene elements and from this to infer the definition of amplitude values. Similar processes may be used to assess Signal amplitude and Tone Scale.

Noise

Noise is sensed by measuring amplitude variations and power spectrum in known patches or known uniform areas within an image. It is also possible to measure noise spectra as the difference between an unmodified image and an image from which the noise is removed by spatial filtering or by averaging across successive frames using motion compensation. The Noise amplitude and other noise characteristics such as power spectra, autocorrelation function, and/or noise amplitude as a function of signal amplitude (for example scene density) can all be sensed in this manner. Another technique Sensing image noise is to use wavelet methods to characterize the noise. These methods produce parameters based on wave amplitude and phase, which can be used to control noise "look". It is also possible to identify the noise type such as Random Noise or Quantization noise by performing noise measurements such as histogramming or by subtracting out the scene content using spatial filtering or motion compensated frame averaging and then analyzing the difference using autocorrelation, power spectra or Fourier transform techniques. A simple noise measurement is to choose a uniform shading corrected area as already described and measure the standard deviation of signal amplitude across that area. This measurement can be extracted at different colors and intensities and a measure of total noise power at various intensities or colors of an image can be obtained. As it relates to "look", noise can introduce different textures, some of which can be described using terms such as "gritty", "grainy", or "plasticy".

Let us now discuss how these noise measurements would be used. One method is based on reference textures. Once reference textures are chosen the noise parameters described above can be extracted from them and used as reference parameters to control the Modify step when noise is automatically or semi-automatically re-inserted. The automatic or semi-automatic insertion of noise may for example be achieved by adding noise as a function of the amplitude of the signal in the image. Noise is generated using specific noise generation techniques (see for example Robert Gray's U.S. Pat. No. 5,641,596 Gray, Jun. 24, 1997 "Adjusting film grain properties in digital images") and the quantity in the parameters in the noise are derived from the measurements on the reference textures discussed above. It is sometimes necessary to Sense the noise characteristics of the incoming image, compare these values to the desired reference values and then insert sufficient additional noise to achieve the desired noise value. Referring to FIG. 7 this would correspond to minimizing or removing the removal step 404 and providing along line 413 the desired reference noise information. The incoming image on line 414 would then be used by the Sensing step to determine the noise parameters of the incoming image.

The step of Sensing the amount and character of noise to be inserted based on reference noise and reference noise of the incoming image is firstly based on the fact that noise power is additive thus the desired noise power is defined as:

[reference noise power at a specific amplitude]–[incoming noise power at the same image amplitude].

If the reference noise power is less than the incoming noise power must be reduced. This can be achieved by applying the Removal step 404. Typical noise removal techniques include noise filtering which can change the perceived resolution of the image and must therefore be done in conjunction with the desired "look" parameters that are influenced by resolution. Other techniques include non-linear methods such as coring and filtering techniques that are adaptive to scene content. Another technique is motion compensated noise removal referred to by Ozkan, M. K., Sezan, M. I., Erdem, A. T., and Tekalp, A. M., "*Multiframe Wiener Restoration of Image Sequences*", in '*Motion Analysis and Image Sequence Processing*' edited by M. I. Sezan and R. L. Lagendjik, Kluwer Publishers, 1993; "Digital Video Processing", A. M. Tekalp, Prentice Hall, 1995. and Ozkan, M. K, Sezan, M. J. and Tekalp, A. M., "*Adaptive motion-compensated filtering of noisy image sequences*," IEEE Transactions on Circuits and Systems for Video Technology, vol. 3, no. 4, August 1993, pp. 277–290. This technique is able to reduce noise amplitude without significantly affecting resolution or other amplitude related "look" characteristics of the image. Again, when noise power does not provide a sufficient metric to produce the desired visual "look", then additional metrics such as noise power spectrum or noise auto-correlation function, color correlation or other methods must be used.

Artifacts

Artifacts may include dirt, dust, scratches and these may be Sensed using a variety of techniques which take advantage of their uncorrelated occurrence between frames, the sharpness of transitions and the fact that dirt or dust may be white or black but rarely colored. Artifacts due to compression and other digital processes are generally correlated between frames and are therefore more difficult to detect. Unlike grain, artifacts that are noticeable are considered undesirable and for highest quality images should be reduced to imperceptible levels.

Figure 11:
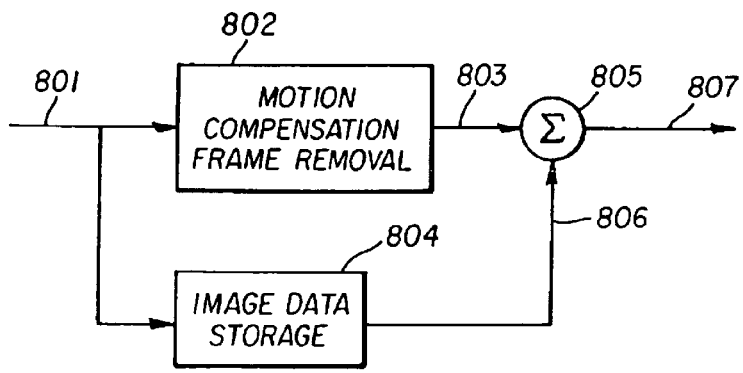
FIG. 11 is a block diagram representation of a sub-system for sensing artifacts in digital image data in accordance with one embodiment of the invention.

One way for detecting frame to frame differences involves motion compensated noise removal based methods which first develop an artifact-free image based on prior and subsequent images in a motion imaging sequence and then subtract the original frame from the artifact-free equivalent frame. This produces a difference image that will contain both noise grain and other artifacts. Artifacts can be identified as being outside the expected distribution of noise and also from the high correlation to surrounding pixels. FIG. 11 shows a method for detecting artifacts in the Sensing 402 or Verifier 411 steps. The incoming signal for example on line 401 or 409 enters on line 801 and passes for motion compensation frame removal technique 802 which produces an output image on line 803 which is the motion compensated average of successive frames where the averaging is performed in such a way that if the reference pixel does not correlate (meaning that the average value across frames of that pixel is different by more than the statistical noise margin than the actual value of the pixel in the reference image) then the average is taken only over those pixels in successive frames which fall within the noise margin. This produces an artifact free image on line 803 that has considerable noise improvement over the noise in incoming line 801. The amount of noise improvement is a function of the number of frames over which the 802 function averages. Storage means 804 delays the incoming signal on line 801 by an amount equal to the delay of function 802. Differencing unit 805 differences takes the difference between the output of 804 on line 806 and the output of 802 on line 803. Thus on line 807 is a signal containing both artifacts and the noise removed by 802.

Figure 12:
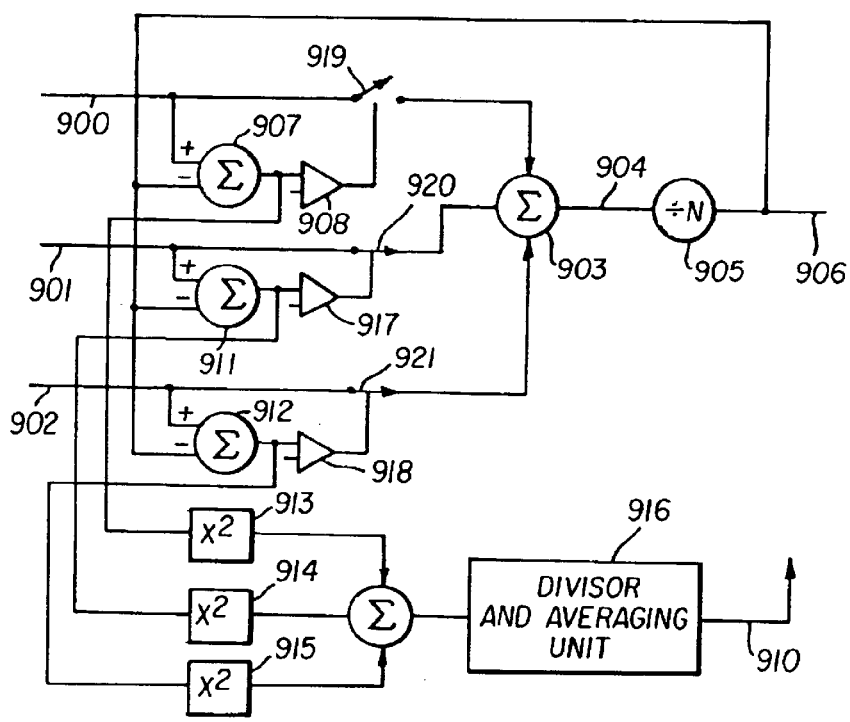
FIG. 12 is a schematic representation for an averaging process which may be performed by function 802 of FIG. 11.

FIG. 12 shows the averaging process formed in function 802 diagrammatically, for a motion compensated average across 3 frames (of course, larger number of frames may be used). These three frames are considered the central frame that enters on line 901 as an unmodified representation of that frame. A preceding frame that enters on line 900 and has been motion compensated to correspond to the central frame 901 and a subsequent frame 902 which has also been motion compensated to correspond to frame 901. The value of a given pixel in the image is added together in adder 903. The sum on line 904 is then divided by N in divider 905 where in this case N would correspond to the value of 3 to provide a true frame average on line 906. Before the next pixel on frames 900, 901, 902 appears a second step takes place. In this step the value of the average on 906 is subtracted from the value of the pixel on line 900 by subtractor 907 and the resulting signal is sent to a comparator 908 that determines if the difference exceeds a statistically preset level. This statistically preset level that is defined by line 910 is determined by sampling the differences between the average value on line 906 and the incoming value using the difference units 907, 911 and 912. The output of these difference units is sent to functions that take the square in units 913, 914 and 915. This square is then summed and divided by N which in this case is equal to 3 and then averaged over successive pixels in divisor and averaging unit 916. The output 901 becomes the reference value for the absolute value comparators (that is to say these comparators assess whether the incoming signal from summers 907, 911 and 912 exceed either positively or negatively the incoming reference on line 910 which connects to comparators 908, 917 and 918. If the output of comparators 908, 917 or 918 indicates that the absolute magnitude is exceeded then switches 919, 920 and 921 are activated respectively forcing the incoming value into summer 913 to zero. In addition, if any switch does force any incoming value of summer 913 to zero then the value of N in divisor unit 905 is reduced by one. If N reaches zero then the divisor unit 905 inserts on line 906 the average value of surrounding pixels that have already been computed using this process.

This method for Sensing or Verifying artifacts involves comparing the incoming signal with the output of the process in FIG. 12, the difference being an image of artifacts which can then be analyzed by digital counting or sizing method. When it is determined that artifacts exceed the level required to provide a certain "look" by comparing the measured artifact level with the specification for count or size the process such as the one described above can be performed across an entire image, an entire scene or a complete motion picture in the Removal process to remove the artifacts so as to achieve the desired "look".

Film Grain Noise

Film grain noise as with other noise may, depending on prior processing, be correlated between colors or uncorrelated. If it is known that the image is originated from film and if the scanner, which scanned the image, is known to have a low level of noise then the noise sensed in the image may be assumed to be grain noise. Thus, the methods mentioned above other prior art methods may be used to Sense, Remove, Insert and Verify grain noise.

As part of the Sensing and Verifying Functions grain noise may be measured using power spectral analysis techniques for example taking the Fourier transform of the 2D autocorrelation function of the image data in flat or uniform areas of an image or test image. The same method may be used for Verifying noise levels. Both Adobe Photo shop version 5.0 and Cineon image processing system by Kodak include methods for measuring and inserting grain noise.

Noise or grain can be removed using motion compensated frame averaging techniques that are inserted in the Removal function of the Modifying process. Alternatively filtering methods may be used to Modify grain and noise. In the past, using just filtering to sharpen an image has been unrealistic. This is because frequency peaking detail in film images, in the same way as is done with electronically generated images, misrepresents the grain noise. By using motion compensated noise removal to reduce the amplitude of the film grain, peaking of film images can be applied to achieve subjectively sharper images while preserving (or adding or even reducing) the overall system amplitude response to film grain. As already mentioned Kodak patent U.S. Pat. No. 5,641,596 Gray, Jun. 24, 1997 "Adjusting film grain properties in digital images" discloses superior technology which provides a greater degree of photo-realism, addresses adding grain to film images after digital processing of the film image data has removed the grain. In the case of grain, the task of the Sensing operation is to sense the grain using for example Wiener power spectrum techniques and then adjust the grain level to produce the desired "look" by removing grain using frame averaged noise removal techniques or adding grain as described above.

Position

Position is related to set up of the camera and the magnification used. If this data is known it is, when necessary, possible to compute the relationship between specific values and the camera coordinates. It may also relate to the dimensions of the scene such as depth and scale. Once depth (z) is known it is possible to compute the scene coordinates of specific pixels. Thus if it is desired to remove haze or introduce other position related effects such as modifying or sculpting the depth of field profile it may be necessary to add to a camera depth sensing or range finding devices which generate data corresponding to the depth coordinates of specific x, y points in the image. Consequently the Sensing and Verifying operations may need to have information related to the depth of every pixel of the field of view in order to Sense whether the levels of haze as desired by the "look" or for example sharpness to control apparent depth of focus of the "look" need to be Modified or meet specification respectively.

Amplitude at a specific point in the image is defined by the magnitude of a pixel value that may, as discussed above, be linked back to specific x, y, and z points in a scene. Linking pixel position back to the x,y, and optionally z points of the scene may be necessary if the required "look" requires changes in perspective in the Modifying operation. These changes in perspective are first determined by the focal length of the camera lens and the geometry of the scene. They may be modified using warp functions in the Modification process. Specific desired "looks" (e.g., generating a fish-eye appearance or projecting the image onto a curved surface) may require automatic Sensing of the taking geometry.

Scan Format is usually sensed from headers in a digital file or from the pattern of vertical and horizontal synchronizing signals in an image. Certain "looks" may require resolutions that impose scan format restrictions.

The amount of filtering and characteristics of filtering applied to an image can be Sensed by analyzing test frequency test images, slant edge images or other test images inserted in front of the camera during the capture of a scene. If these are not done then it is possible to identify obscuring objects that are in focus and analyze the edges of these objects to Sense the filtering that has been applied to the scene. This is easier to Sense if the filtering is linear and can for example be characterized by a modification of the Modulation Transfer Function of the image by the signal path. The Sensing process is more complicated if filtering is nonlinear with either contrast or amplitude.

Flare can be determined from the black level of test images inserted in the scene or sometimes from the level of the blackest signal in the scene. Once the flare level is determined, the Sensing operation must determine the parameters required to remove the flare. This as in other image parameters will be determined by the available Modifying, including optionally removing and inserting tools. One way to remove flare is simply to subtract an average value across the entire image corresponding to the degree to which black levels in the image exceed the preset black reference level. Another way is to assess the flare characteristics of the lens using test images. Generally, these characteristics result in greater flare near image highlights and other bright areas of the image. Based on the distance of each point in the image to these bright areas offsets can be computed to remove the modeled flare. The Sensing function would then provide to the Modify function the coefficients required to compensate for the optical flare profiles of the lens. As previously mentioned this may involve a direct computational approach including with apriori characterization of the flare removal algorithms that are implemented in the Modify function.

RESOLUTION

Resolution is often characterized by the number of pixels per line or by Modulation Transfer Function (MTF) as already mentioned. The Modulation Transfer Function (MTF) from scene to Sensing unit input line 401 is defined as $F_s(f)$, where f is frequency in line pairs per picture height, and the MTF from the Output 409 to the modify function to the point where the "look" is specified is, for example on the display, is $F_d(f)$. These functions are computed in the Sensing function 402 by applying images or test images through the chain having lines or sine waves to whose ratio of amplitude at various frequencies f are measured to generate the MTF. For example $F_s(f)$ is determined by the ratio of amplitudes from the scene to the line 401 referenced to the amplitude response of large areas having the same gray values as the lines or sine waves. These are readily automated using software that identifies the lines or sine waves by position or by waveform as mentioned with reference to FIG. 8. Alternatively, if only edges are available the Sensing unit 402 can analyze the Edge for example using ISO Tc42/Wg18 Slanted-Edge Spatial Frequency Response (Sfr) PhotoShop Plug-In (V6.1.3) to generate the MTF. All that is necessary is that the Sensing function 402 detects an edge in the scene that is formed from an object boundary that falls within the depth of focus of the camera. It can then use the frequency response of that edge to determine $F_s(f)$.

The Sensing Unit determines $F_d(f)$ by either having information downloaded regarding $F_d(f)$ from independent measurements performed at the display or alternatively by sending images or image related parameters to the Sensing unit from downstream locations such as where the image is distributed, from the projection unit, or from the display screen. The Sensing unit then uses the methods already described to determine $F_d(f)$.

The desired "Look" MTF is defined by the cinematographer selecting from a range of available "Look" MTFs, from a pre-prepared gallery of "Looks" where the same scene is shown at different MTFs, or by undertaking his own experimentation. From scene to Display (or other "look" specification point where the values of the "look" characteristics are specified), the MTF of the desired "look" is defined as $F_1(f)$. This information is communicated on line 413 to Sensing Unit 402. The Sensing Unit 402 then computes the Modify Filter function is defined as $$F_m(f) = \frac{F_l(f)}{F_s(f) * F_d(f)}$$

The sensing unit next computes the filter coefficients for the Modify function 417 to implement $F_m(f)$ and passes these on line 407 to the Modify Function. The filter coefficients may be determined by computing the inverse Fourier transform of $F_m(f)$ and defining the convolution kernel by setting the kernel coefficients to the values of the real part of the inverse Fourier transform which corresponding to the spatial positions of the kernel coefficients. Other filter design techniques may also be used.

Because the filter design is often under-constrained, determining the power noise spectrum of the resulting system while computing the filter characteristic enables the selection of a filter which both satisfies sharpness and noise requirements simultaneously. The noise power spectrum of a system at the "look" specification point (where the "look" characteristics are specified) is defined as the noise power spectrum at is source in the system times the square of the MTF from source to the point where the "look" specification point. This measure can be included in the Sensing function filter optimization process that may be based on Newton-Raphson or other optimization methods. As result, noise response and sharpness may be simultaneously optimized automatically.

The Modify function is next called on to process the entire scene or feature film using these coefficients.

If it is desired to first produce a reference "look" then the desired reference "look" is defined as $F_r(f)$ and the equation for the Remove filter function 404 applied in the Remove step is operation is defined as $$F_{rm}(f) = \frac{F_r(f)}{F_s(f)}$$

The next step of Insert is then defined as $$F_i(f) = \frac{F_l(f)}{F_s(f) * F_{rm}(f)}$$

where in this case the desired "look" is defined as $F_1(f)$ from reference "look" to look specification point. In this case the "look" is defined with respect to the reference "look" not with respect to the scene.

Sharpness can be determined from a variety of measures of resolution generally based on data from MTF. An example discussed above in the Interaction Between Functions Section outlines this process for sharpness. Note however if the "look" reference point is for example at the retina or a perceptual parameter then the characterization or retina or perceived sharpness would be included in the downstream MTF.

Edge Profile may be assessed by capturing and analyzing the profile response across a specific edge transition.

Rise distance is a measure of sharpness and may also be used as a sharpness parameter.

Focus influences sharpness and can also be characterized by MTF.

Depth of Field profile indicates or can indicate MTF as a function of z position with respect to the camera of the camera lens.

Aliasing is an artifact related to the interaction of MTF, frequency content of the scene and scan format.

While frame rate is normally fixed, it also can influence "look" and may be modified for example in order to make motion acceptable or to minimize motion artifacts.

Jitter can be sensed in a scene and can interfere with final "look". The application of motion compensated algorithms in the Modify step can remove jitter and the application of pixel offsetting algorithms can insert jitter. Jitter can be measured in the Sensing step by comparing a motion compensated version of an incoming image with the original incoming image and assess displacement between these two images using correlation techniques. Jitter downstream of the transformation process is not compensated for but can be taken into account by removing more jitter than is required in the Modified process so that the total jitter in the image does not exceed the "look" specification at the "look" reference point.

Weave is a low frequency form of jitter normally in the horizontal direction and similar comments apply as in the jitter above.

Relating Parameter Values to Look

By sensing the values of a selection of the above parameters plus other image based parameters it is possible to determine "look" characteristics in some cases using the actual scene but also by using the appropriate test images. Specific Looks will have specific ranges for some of these and other parameters. There are a number of points through the image chain where these parameters can be measured. Specific looks will have specific values for these parameters that will vary depending on the point on the chain where the measurement is done. The reason for this is that subsequent processes in the chain will change these values. Consequently, it is necessary to understand the impact of subsequent functions in the film chain on specific parameter values so that the desired "look", defined as a specific set of values at a specific end point in the chain can be achieved.

Consequently, it is necessary to characterize the chain after the point at which the value is sensed so that the impact of subsequent functions in the chain on specific values can be predicted. Once the impact of subsequent functions in the chain on the values of specific parameters is known it is then possible to compute desired value of a specific parameter at some other point in the chain. Generally, this other point will correspond to the point at which, or directly downstream of the point at which the image is being modified so that the desired "look" is achieved.

Figure 13:
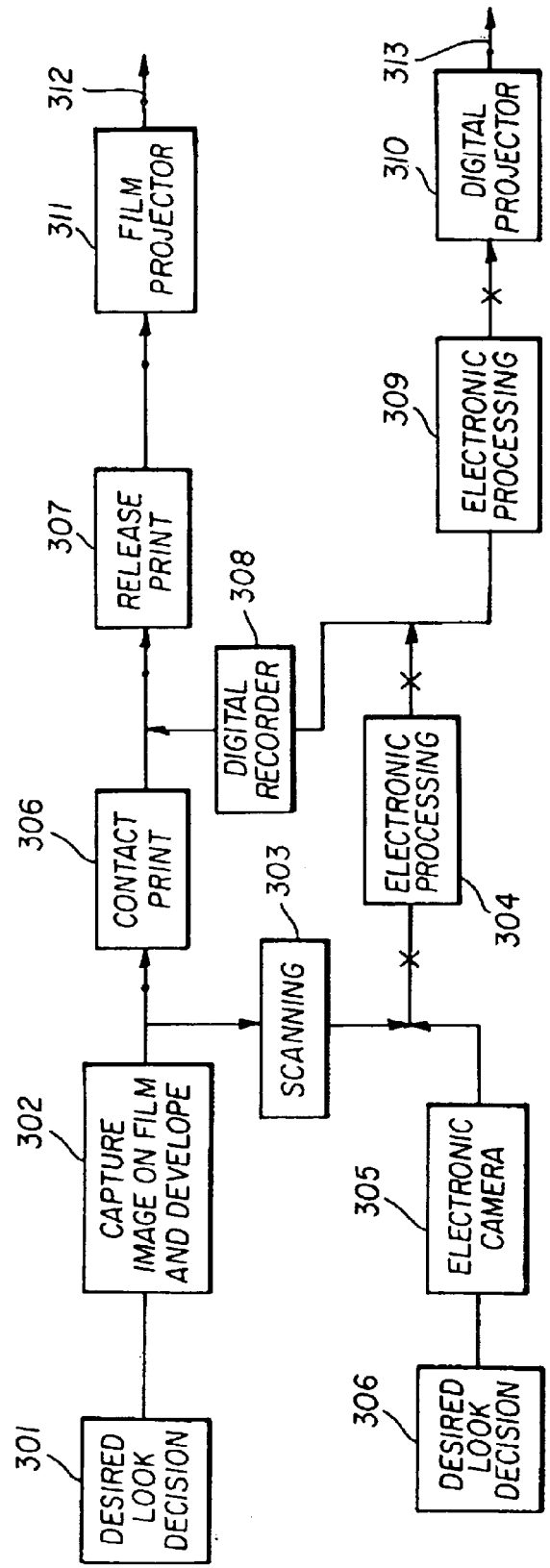
FIG. 13 is a block diagram representation of simplified flow paths for production of a motion picture image.

FIG. 13 shows a highly simplified flow path for image production. The upper path corresponds to a strictly film based process while the lower path corresponds to a strictly electronically based process. The first step in defining the "look" of an image is to choose the "look" and decide on how it will be obtained. This decision process for capture on the film negative is represented by function 301. Here the decision as to the type of film to be used, the lighting, type of exposure, lens filters (including diffusion and blurring filters) aperture settings for depth of field, type of film for both capture and release print, type of film processing and other factors which influence "look" are made. A latent image is then captured on film in a camera and processed in function 302 to provide a developed film image. Scanning function 303 scans the processed negative of the camera to generate digital image data. Electronic processing to modify the image data look in accordance with the invention may be performed in block 304. In an electronic path where the image is captured by electronic camera 305 a different (but similar to decision process 301) decision process must be made at the decision process function 306. Again, similar considerations will apply.

Other functions in FIG. 13 are the contact print function 306, the release print function 307, each of which had influenced "look" by changing the color and exposure in the film. Function 308 corresponds to a recorder, which writes film from digital data, and function 309 corresponds to specific processing necessary to compensate for the characteristics of digital projector 310. Function 311 corresponds to a film projector and point 312 and 313 correspond to CCD cameras positioned to view the projection screen to produce digitized image data that can be used to assess the "look" on the screen. It will be appreciated that in the case of point 312 the camera will need to be synchronized to the exposure to compensate for film flutter.

Having made these decisions parameter values can be computed based on the desired "look". For example if a clean sharp "look" with little depth of field is required, then the decision would be made to use a low grain film and possibly perform additional grain reduction functions in processing block in 304 to achieve a noise free "look". In addition, lens settings would be set for a large depth of field so that the depth of field profile as a function of position produced a high depth of field. This would be translated to a high MTF in regions of the image that were outside the focal plane. The possible positions at which parameters are computed are shown as either dots or crosses in FIG. 13. Dots correspond to points at which a CCD scanner would be introduced to scan the film so that the parameters could be measured while crosses correspond to points at which measurements can be made using software which analyzes the image data.

Producing a Standard Reference Look for Archival Purposes

The goal of this specific "look" is to provide quality image data which can meet specific standards and provide an assurance that the images represented by this data can be used to produce a range of subsequent looks (some of which may involve the use of future technology) without any degradation to the appearance of the final image in any one of the range of subsequent looks. Generally this "look" will have a lower noise characteristic, higher resolution, wider color gamut, and wider dynamic range than other specific looks.

To take this Standard Reference "look" for Archival Purposes data and reach a desired "look" involves sending the signal in on line 401 and producing the desired "look" at line 409. Generally, there will be little required of the removal function from the noise removal point of view.

One way to use a reference "look" is to ensure that the Remove step 404, removes the intrinsic "look" of the image on line 401 and produces a reference "look" into which the desired "look" is inserted in step 408. This approach can reduce the number of different transformations required. For example when going from N different "looks" corresponding to different camera settings or films to M other output "looks" for example DVD, film, HDTV, 70 mm instead of requiring N*M combinations the reference approach requires only N+M combinations of Look Transformations.

Producing a Desired Look

Producing a desired "look" from specific incoming data from line 401 involves sensing the characteristics of the incoming data in the Sensing function and then based on the information on line 414 and selecting the appropriate Removal and Inserting algorithms and then computing the coefficients for those algorithms which would modify the incoming data from the Sensed "look" to the desired "look" specified on line 413. For example, to create a photo realistic look within an electronically captured image, it may be desirable to modify amplitude characteristics of the image data. In film systems amplitude information is represented by concentrations of dye in the developed image. These random concentrations in both amplitude and position mean that the image amplitude data is continuously represented although it has added to it an apparent noise. Because the eye is adapted to looking at continuous images in the real world this lack of spatial and intensity quantization provides a more pleasing "look". Thus in a digital system to achieve a desired film "look" it may be necessary to remove all hints of all spatial and amplitude quantization over the entire amplitude range or dynamic range of the image.

Some look parameters can be changed with position in the color space or as a function of luminance or pixel location. In addition or independent of these adjustments coefficients or relationships controlling the insert, remove or modify functions can be changed with position in the color space or as a function of luminance or pixel location. These changes may be desired to add a new look or to ensure that the transformed signal remains within the available dynamic range.

Preserving Key Data so that a "Look" can be Achieved from Source Data

In each of the areas identified it is important that key information associated with the "look" not be irretrievably lost in the capture or display process. A further issue to be addressed in preserving the amplitude information of a scene is to recognize that broadly stated the eye is sensitive to the ratio of light across a scene as distinct from the absolute brightness of the scene. Therefore the sensitivity of the eye is logarithmic rather than linear and this in part accounts for the very wide dynamic range to which the eye is sensitive. For example, we can see as much detail in shadows as we can in bright sunlight even when both are in the same scene.

Figure 14:
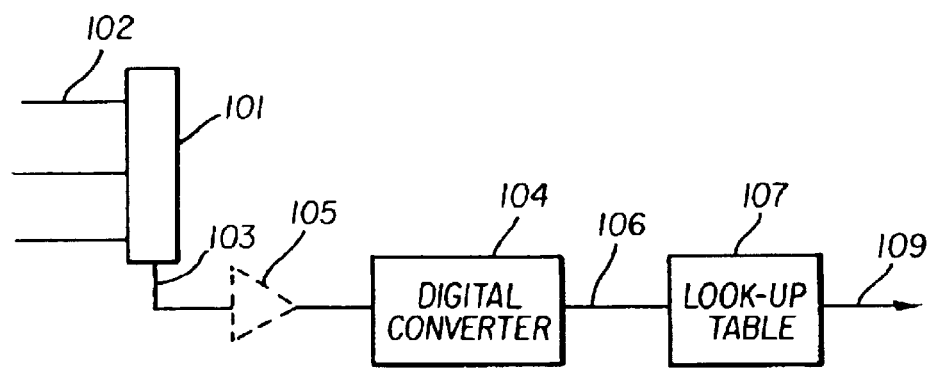
FIG. 14 is a block diagram representation of a sub-system for converting image data captured with an electronic camera sensor to digital form.

Film reacts to a scene in a logarithmic like way and is therefore able to also capture a wide dynamic range. Electronic camera senses are, however intrinsically linear. It is therefore necessary to ensure that the very wide range can be electronically captured. As shown in FIG. 14, the first step of processing data in an electronic camera is to receive the signal from sensor 101 which receives light in the direction denoted by arrows 102 and this signal emerges on line 103 from sensor 101. Generally, the signal at this stage contains current or voltage whose amplitude is lineally proportioned to the light level at each point across the image. The next step is to feed this signal into an analogue to digital converter 104. An alternative approach is to insert on line 103 a logarithmic style amplifier 105. The disadvantage of introducing a logarithmic amplifier on line 103 is that such amplifiers can introduce noise to the signals and although they may be built integrated into the circuit using carefully matched techniques there remains the risk of thermal drift that can change the resulting amplitude signal. The alternative approach is to use a precision A to D converter but in order to obtain a range of ten bits of logarithmic scale it is necessary that the linear A to D converter in fact be capable of fourteen binary bits of linear scale. Similarly, if it is desired to obtain eight bits of logarithmic scale it is necessary that the A to D converter 104 have a precision of twelve bits of linear scale. This approach then involves carrying the fourteen bits of data on line 106 to a look-up table 107 that is capable of providing a fourteen bit (corresponding to 16384 memory locations). Data is then output on line 109 as a ten-bit result.

Figure 15:
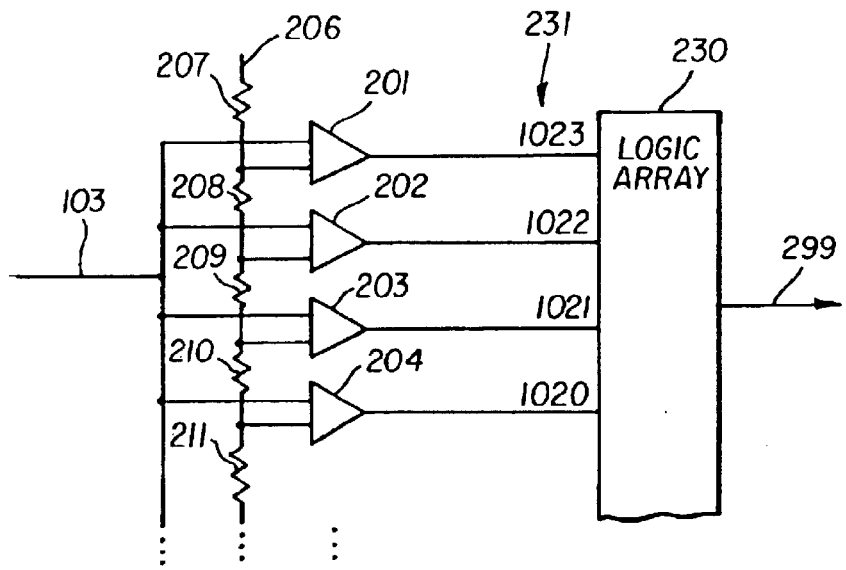
FIG. 15 is a schematic representation of a ten bit logarithmic analogue to digital (A to D) converter which may be used in the sub-system of FIG. 14.

A further alternative approach is to use a ten bit logarithmic A to D converter. This is shown in FIG. 15. The incoming signal on line 103 connects to 1,024 comparators such as comparator 201, 202, 203 or 204. Reference signals for such comparatives are developed by a voltage divider chain that is set at a reference voltage established at point 206 and then divided down by resistors 207, 208, 209, 210 and 211. The outputs of 1,023 comparators pass to logic array 230 that senses these outputs and outputs ten bit binary data on line 299. It will be appreciated that the logic process involved in function 230 senses either the number of inputs which are positive or high and outputs that data as a binary number or senses the number of the input which is different from its neighbor above it (because of how the comparators work there should only be one such input). Output 299 has a binary number corresponding to the number such as the numbers indicated in column 231 as a binary value. A further advantage of encoding the image data in the logarithmic or ratio like way is that it avoids the need for discontinuities or knees in the amplitude curve shape which can introduce hue shifts in color at the neighborhood of the knee.

The invention has been described with reference to a preferred embodiment. However, it will be appreciated that variations and modifications can be effected by a person of ordinary skill in the art without departing from the scope of the invention.

What is claimed is:

1. A process for transforming digital source image data corresponding to multiple image frames in a motion imaging sequence to provide a desired image look at a specified point of an imaging step chain comprising:

defining desired values for at least two image look parameters associated with the desired image look;

sensing data from multiple image frames in the motion imaging sequence which correlates to the values of the defined image look parameters for the digital source image data; and modifying the digital source image data as a function of the sensed data to provide digital output image data corresponding to the motion imaging sequence at the specified point with at least one image look parameter value closer to the defined image look parameter value associated with the desired image look; wherein the desired image look parameters are defined with respect to an image to be displayed after further processing of the digital output image data downstream of the modifying step, further comprising providing information on the characteristics of the downstream processing, and wherein the modifying step is designed to compensate for effects of the downstream processing on the desired image look parameters.

2. A process according to claim 1, further comprising verifying whether the image look parameter values of the digital output image data provide a desired image look displayed at the end of the imaging step chain.

3. A process according to claim 2, comprising further modifying the digital source image data to provide digital output image data with at least one image look parameter value closer to the defined image look parameter value associated with the desired image look in response to the verifying step.

4. A process according to claim 1, wherein the digital source image data is first modified to provide digital output image data with image look parameter values corresponding to a defined reference look, and the digital output image data is subsequently modified to provide digital image data with image look parameter values corresponding to a desired image look distinct from the defined reference look.

5. A process according to claim 1, wherein desired values for at least three image look parameters associated with the desired image look are defined.

6. A process according to claim 1, wherein desired values for at least four image look parameters associated with the desired image look are defined.

7. A process according to claim 1, wherein the digital source image data represents an original scene image captured with an electronic camera.

8. A process according to claim 1, wherein the digital source image data represents an original scene image captured on photographic film which has been scanned.

9. A process according to claim 1, wherein the values of the defined image look parameters, are sensed for the digital source image data by measuring characteristics of both the actual image and characteristics of test images that are part of a particular scene.

* * * * *